United States Patent [19]

Nakamura

[11] 4,247,977
[45] Feb. 3, 1981

[54] AUTOMATIC TAPE ENGAGING AND SECURING DEVICE

[76] Inventor: Taiji Nakamura, No. 107, Kamikurata-Cho, Totsuka-ku, Yokohama City, Kanagawa Prefecture, Japan

[21] Appl. No.: 973,795

[22] Filed: Dec. 28, 1978

[30] Foreign Application Priority Data

Dec. 30, 1977 [JP] Japan .................. 52-185053

[51] Int. Cl.³ .................................. B23P 19/00
[52] U.S. Cl. ..................... 29/566.1; 29/806; 242/74
[58] Field of Search ............. 29/566.1, 806, 453; 242/74, 74.1

[56] References Cited

U.S. PATENT DOCUMENTS

| | | | |
|---|---|---|---|
| 3,668,759 | 6/1972 | Kendall | 29/566.1 |
| 3,848,265 | 11/1974 | Biert et al. | 242/74 X |
| 4,035,899 | 7/1977 | Matsuda | 29/806 X |
| 4,114,252 | 9/1978 | Kon et al. | 29/806 X |
| 4,121,784 | 10/1978 | Schwartz | 242/74 |

Primary Examiner—William R. Briggs
Attorney, Agent, or Firm—Toren, McGeady and Stanger

[57] ABSTRACT

In an automatic tape engaging and securing device a support mounts a reel having a recessed portion. The interior of the recessed portion is enlarged relative to the opening into the recessed portion. An engaging and securing element supply mechanism supplies an engaging and securing element having the shape of a fringed groove into a position opposite and adjacent to the recessed portion of the reel mounted on the support. A first pushing bar has an inclined surface at one end for pushing one shoulder portion of the engaging element and inserting it into the recessed portion. A second pushing bar has an inclined surface opposite to the inclined surface of the first pushing bar for pushing the other shoulder portion of the engaging element and inserting it into the recessed portion, and a cutter bar is arranged to cut a tape to be engaged.

4 Claims, 8 Drawing Figures

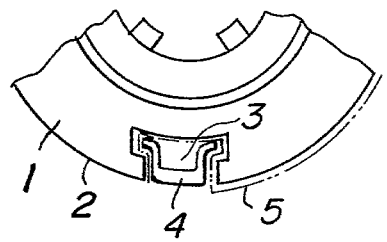
FIG_1
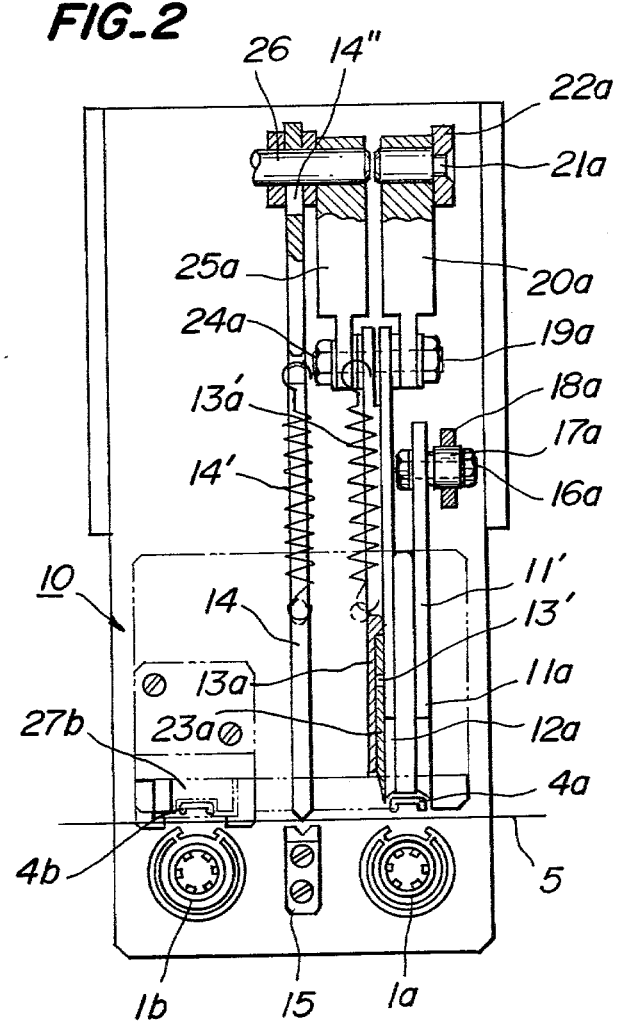
FIG_2

AUTOMATIC TAPE ENGAGING AND SECURING DEVICE

BACKGROUND OF THE INVENTION

The present invention relates to an automatic tape engaging and securing device for a cassette reel.

At present, a cassette reel having a construction as shown in FIG. 1 is comparatively often used. In FIG. 1, reference numeral 1 is a reel body made of synthetic resin or the like, and on its peripheral surface 2 a recessed portion 3 is formed having the shape of a groove, and an engaging and securing element 4 is inserted into the recessed portion 3 so that a tape 5 is held or sandwiched between the recessed portion in the reel body and the securing element. Therefore, the engaging element 4 is groove-shaped with ends projecting outwardly in the form of fringes.

The engagement of the tape 5 is usually carried out by pushing the engaging element 4 into the recessed portion 3 in a manual operation, so that it takes time and becomes a problem when producing cassette tapes. However, an automatic device for solving this problem is not because it is difficult to position correctly the engaging element 4 relative to the recess portion 3 and if it is forcibly pushed, there is the possibility that the reel main body 1 or the engaging element 4 may be broken.

SUMMARY OF THE INVENTION

An object of the present invention is to eliminate the above described disadvantages.

Another object of the present invention is to provide an automatic tape engaging and securing device for automatically, easily and precisely engaging and securing a tape to a reel for a cassette.

According to the present invention an automatic tape engaging and securing device comprises a support for mounting a reel having a recessed portion the interior of which is enlarged as compared to the opening into the recessed portion, and an engaging and securing element supply mechanism for supplying an engaging and securing element. The engaging and securing element is shaped as a fringed groove and is positioned opposite and adjacent to the recessed portion of the reel mounted on the support. A first pushing bar has an inclined surface at one end for pushing one shoulder portion of the engaging element and inserting the end of the shoulder portion into the recessed portion. A second pushing bar has an inclined surface opposite to the inclined surface of the first pushing bar for pushing the other shoulder portion of the engaging element and inserting it into the recessed portion and a cutter bar is positioned next to the second pushing bar for cutting a tape held in the recessed position by the engaging element. The tape is regulated by an upper press disc which contacts the upper portion of the reel in the widthwise direction and it is further regulated by the tape pushing bar and a stop in the thickness direction. The device further comprises the upper press disc elastically supported at one end portion of a rotatable frame, thereby pressing and rotating the reel.

BRIEF DESCRIPTION OF THE DRAWING

FIG. 1 is a partial view showing the constructions of a reel and an engaging and securing element of an automatic tape engaging and securing device according to the invention;

FIG. 2 is a plan view showing the tape engaging and securing mechanism portion of the invention;

DESCRIPTION OF THE PREFERRED EMBODIMENT

Figure 3:
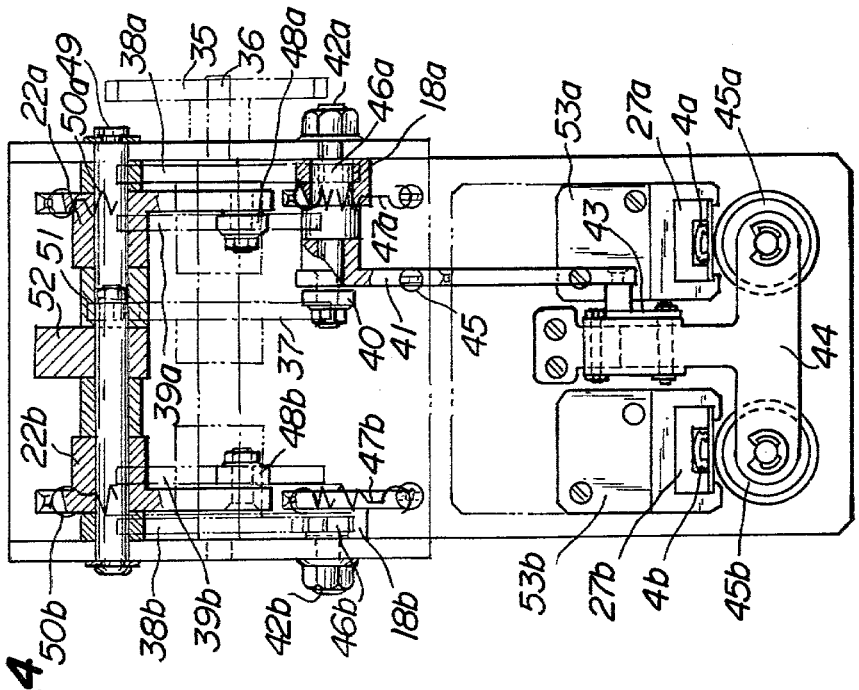
FIG. 3 is a front view showing a cam arrangement for driving these engaging mechanisms and the driving source for the cam arrangement.

Referring now to the drawing, wherein the same reference characters designate same or corresponding parts throughout the several views, FIG. 2 shows one embodiment of an automatic tape engaging and securing device according to the present invention.

As shown in FIG. 2, the embodiment shows simultaneous engagement of the tape 5 with a pair of reel bodies 1a, 1b. Reference numeral 10 is a base plate of this device, arranged with a first pushing bar 11a provided with an inclined surface at the end adjacent reel body 1a and, a second pushing bar 12a provided with an opposite inclined surface and a cutter bar 13a. The same construction is provided on the side of reel body 1b, which is omitted in FIG. 2. Reference numeral 14 is a common tape pushing bar and a stop or support 15 is provided opposite the end of the pushing bar and between the reel bodies 1a, 1b.

At the base end of the first pushing bar 11a, a small roller 17a is secured on a portion of a shaft 16a. Reference numeral 18a is a rotary lever for driving the pushing bar 11a. The base end of the second pushing bar 12a is also secured to a coupling lever 20a on a portion of a shaft 19a. A rotary lever 22a is coupled to shaft 19a for driving a shaft 21a.

The cutter bar 13a is provided with an exchangeable blade 23a and at its base end it is secured to a coupling lever 25a by means of a shaft 24a. Further, the coupling lever 25a is coupled to a shaft 26.

A hole in the blade 23a engages a pin 13' projected from the cutter bar 13a and is held in place being sandwiched between the second pushing bar 12a and the cutter bar 13a. The blade 23 can easily be taken out by removing a spacer 11' between the first and second pushing bars 11a, 12a and releasing the pushing bar 12a from the cutter bar 13a.

The base end of the tape pushing bar 14 is also coupled to the shaft 26. Reference numeral 27b shown by a two-dot chain line is a magazine as an engaging and securing element supply mechanism, which will be explained later on, and 4a, 4b are engaging and securing elements.

The construction for driving these pushing bars 11a, 12a, the cutter bar 13a and the tape pushing bar 14 will be explained hereinunder. At first, the fundamental portion will be explained with reference to FIG. 3. In FIG. 3, reference numeral 28 is a motor final reduction gear and its shaft 29 is connected to a shaft 32 through bevel gears 30, 31. The shaft 32 is provided with a cam 33 for driving an upper pushing disc. Rotation of the shaft 32 is transmitted to a shaft 36 through the engagement of gears 34, 35. The cutter bar 13a (13b) and the shaft 36 are provided with a cam 37 for controlling the tape pushing bar 14, with cams 38a, 38b for controlling the first pushing bar 11a (11b) and with cams 39a, 39b for controlling the second pushing bar 12a (12b).

Figure 4:
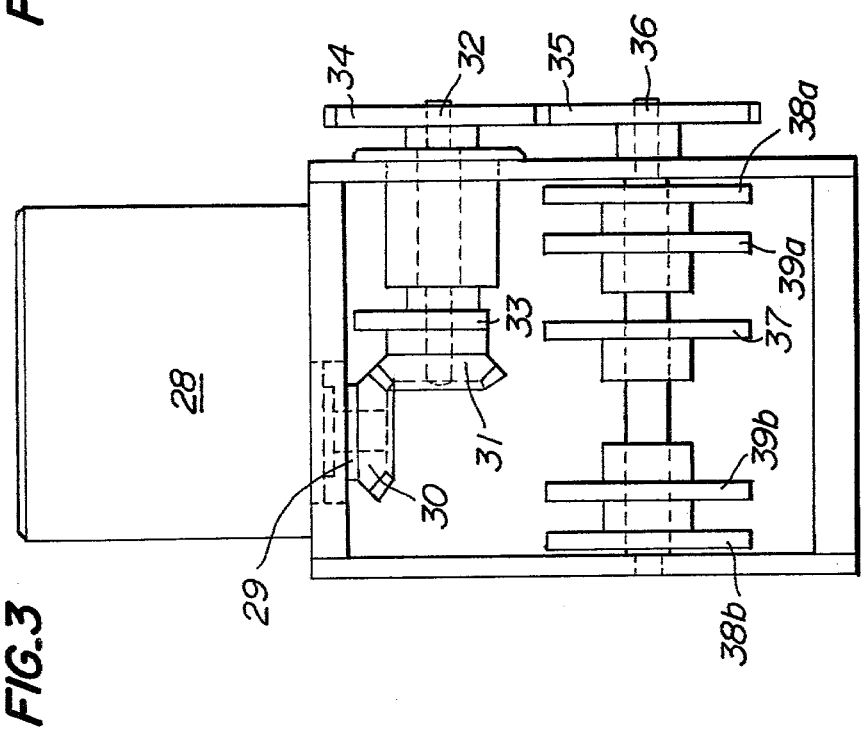
FIG. 4 is a plan view showing the relation of the cam arrangement.
Figure 5:
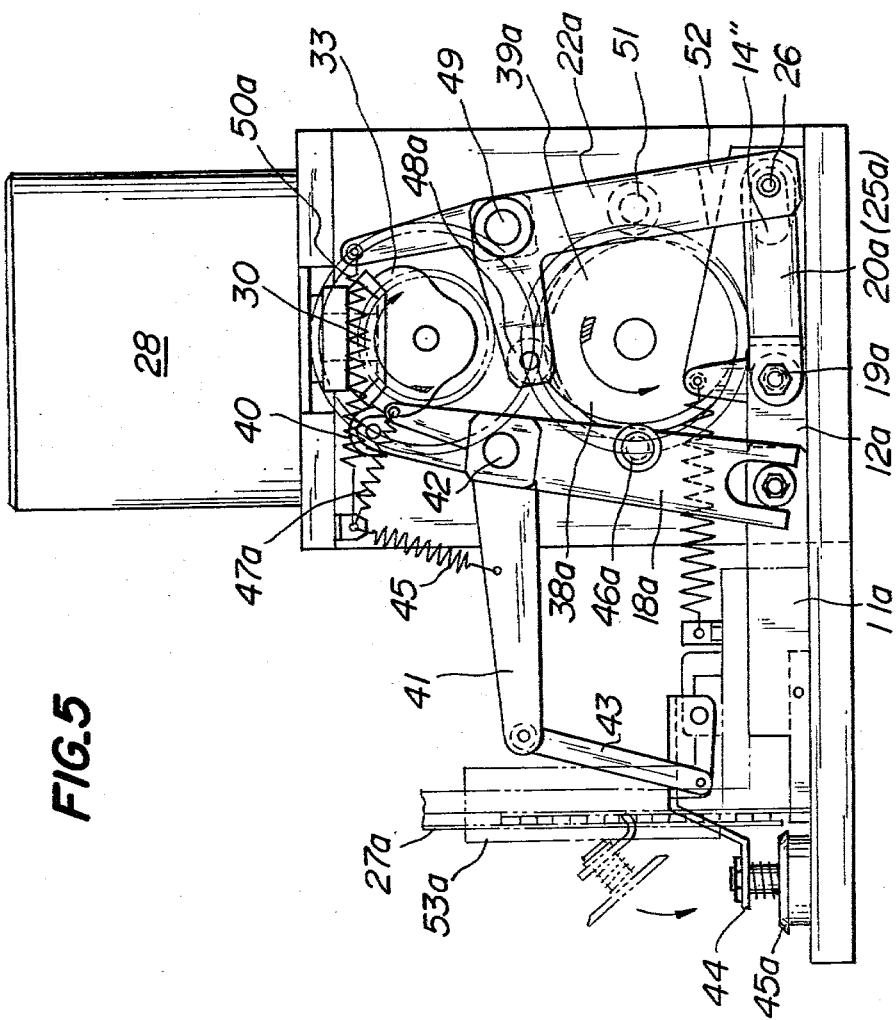
FIG. 5 is a side view showing the whole construction.

In FIGS. 4 and 5, reference numeral 40 is a small roller for driving the cam 33 by contact. A bent lever 41 is mounted at one end of the small roller 40 is rotatable around a fixed shaft 42 and coupled to a T-shaped rotary body 44 by a coupling lever 43 at the other end. The T-shaped rotary body 44 elastically supports a pair of upper pushing discs 45a, 45b on the other ends thereof. Reference numeral 45 is a spring for constantly pulling the bent lever 41 upwards.

Reference numerals 46a, 46b are small rollers in driving contact with cams 38a, 38b. The small roller 46a is mounted at one end or the rotary lever 18a, and the rotary lever 18a is also rotatably supported by the fixed shaft 42a. Reference numeral 47a is a spring for constantly biasing the rotary lever 18a in the counterclockwise direction. One end of the small roller 46b is mounted on the rotary lever 18b, it is rotatably supported by the fixed shaft 42b and it is biased by the spring 47b in the same manner.

Reference numerals 48a, 48b are small rollers in contact with cams 39a, 39b, respectively, for rotation. The small rollers 48a, 48b are provided at ends of the projecting portions of the rotary levers 22a, 22b, respectively. Each of the rotary levers 22a, 22b is rotatably supported on the fixed shaft 49. Reference numerals 50a, 50b are springs for constantly biasing rotary levers 22a, 22b in the counterclockwise direction.

Reference numeral 51 is a small roller in contact with the cam 37 for rotation, and coupled to the tape pushing bar 14 on the portion of the shaft 26 by means of the rotatable rotary lever 52.

In addition, in FIGS. 4 and 5, reference numerals 53a, 53b are magazine holders for stably holding a magazine. The magazines 27a, 27b contain a number of engaging elements aligned therein and successively supply them one by one.

The function of the engaging and securing device will be explained. At first, in the stand by state, the first pushing bar 11a, the second pushing bar 12a, the cutter bar 13a and the tape pushing bar 14 are in the position shown in FIG. 2. The engaging and securing element 4a is supplied by the magazine 27a and is arranged opposite the recessed portion 3 of the reel body 1a. Further, in FIG. 5, the upper pushing disc 45a is at the position shown by a two-dot chain line.

When the motor final reduction gear 28 is driven, the shaft 32 is rotated through the bevel gears 30, 31, and the shaft 36 is further rotated through the engagement of the gears 34, 35. Thus, the cam 33, and then the cams 37, 38a, 38b, 39a, 39b are rotated.

In the first place, the cam 33 contacts the small roller 40 for rotating the bent lever 41 in the counterclockwise direction, and the upper pushing disc 45a is moved into contact with the reel body 1a in the covered state by the coupling lever 43 and the T-shaped rotary body 44. In this position, even if the tape 5 floats slightly from the base plate 10, it is pressed by the upper pushing disc 45a and its position is regulated. In addition, if a thickness of the reel body 1a is for instance 4 mm, a width of the tape 5 is chosen as 3.8 mm, so that the tape 5 is regulated by the upper pushing disc 45a and precisely engaged with the reel body 1a. For the same reason, the same thickness is shown for the engaging element 4a e.g., 3.8 mm.

Figure 6A:
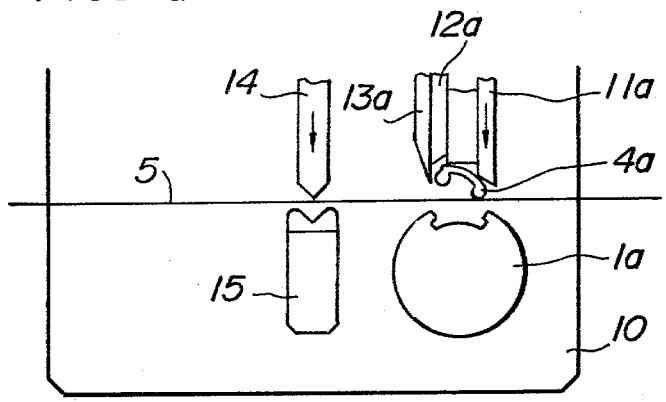
FIGS. 6a, 6b, and 6c are views of different positions of the reel body and the tape engaging and securing mechanism portion.

Here, the cam 37 is actuated to push the small roller 51, and move the tape pushing bar 14 through the rotary lever 52 so that it contacts the tape 5 as shown in FIG. 6(a). At the same time, the cam 38a is actuated and rotates the small roller 46a turning the rotary lever 18a in the clockwise direction and moving the first pushing bar 11a in its longitudinal direction. Therefore, as shown in FIG. 6(a), the inclined surface of the pushing bar 11a contacts the shoulder portion of the engaging and securing element 4a so as to incline it for easy push-in. In this case, the engaging element 4a is surrounded by the pushing bars 11a, 12b, the cutter bar 13a and the tape 5, so that the position of FIG. 6(a) can be maintained without deviation.

Figure 6B:
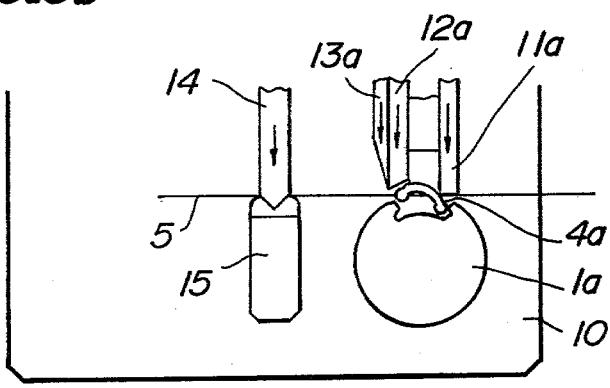
Figure 6C:
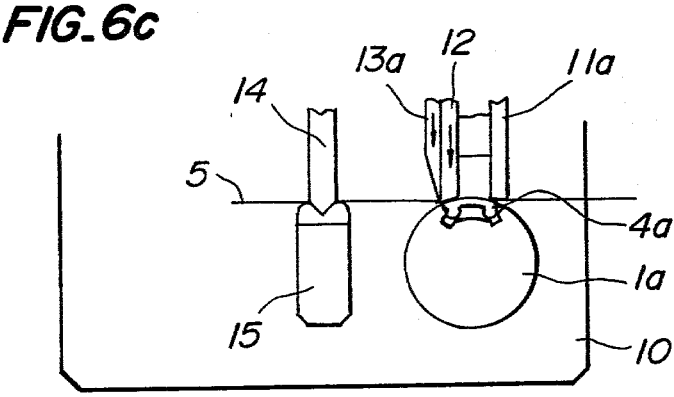

As tape pushing bar 14 and the pushing bar 11a are further advanced, the cam 39a is actuated, and the cutter bar 13a starts to move in the longitudinal direction through the small roller 48a and the rotary lever 22a, and at the same time the second pushing bar 12a also starts to move. Thus, the tape 5 is held between the tape pushing bar 14 and the stop 15 as shown in FIG. 6(b), and thereafter, the tape pushing bar 14 releases the shaft 26 so that it is free in the base end side long hole 14″, and the engaging element 4a is inserted into the recessed portion 3 at one end in the inclined state. Further, when the second pushing bar 12a and the cutter bar 13a are advanced, they assume the position shown in FIG. 6(c), the blade 23a of the cutter bar 13a cuts the tape 5 by force of a spring, the pushing bar 12a pushes the other shoulder portion of the engaging element 4a and completes the pushing engagement into the recessed portion 3.

Thereafter, the pushing bars 11a, 12a, the cutter bar 13a and the tape pushing bar 14 are returned to the position shown in FIG. 2.

This action is also carried out on the side of the reel body 1b. On the side of the reel body 1a, the tail portion of the tape of the previous cassette is engaged while on the side of the reel body 1b, the head portion of the tape of the next cassette is engaged simultaneously.

According to this engaging and securing device, therefore, the engaging and securing element is smoothly inserted into the recessed portion of the reel body, so that the engaging element and the reel body are not damaged and an automatic tape engagement can easily be carried out. Further, during this automatic tape engagement, the engaging element is regulated at its position by the tape itself, a pair of pushing bars, cutter bar and the like, so that a precise positional relation can be maintained.

In addition, this invention is not limited to the above embodiment but can be modified without departing the scope of the invention.

For instance, in the above embodiment, the tape engaging is simultaneously carried out for a pair of reels, but there is no limitation in number, and there is no problem in case of one or more than three.

In the above described embodiment, if the supply of a reel and a tape is automatized, a function of the device can be more enhanced.

Further, the shape of the ends of the first and second pushing bars is not limited to a straight line but a slightly bent line.

As described above, according to the invention, it is possible to provide an automatic tape engaging and securing device for automatically, easily and precisely engaging and securing a tape with a cassette reel.

What is claimed is:

1. An automatic tape engaging and securing device comprising a support for mounting a reel having a recessed portion in the circumferential periphery thereof with said recessed portion being enlarged in the interior thereof as compared to the opening into said recessed portion, an engaging and securing element supply mechanism including an engaging and securing element having the shape of a groove with outwardly projecting ends, said engaging and securing element being positioned opposite and adjacent to the recessed portion of the reel mounted on said support, a longitudinally extending first pushing bar having one end adjacent to said support and to said engaging and securing element and said one end having an inclined surface for pushing one outwardly projecting end of said engaging element and for inserting said one end into said recessed portion, a longitudinally extending second pushing bar having one end adjacent to said support and to said engaging and securing element and located on the opposite side of said engaging and securing element from said one end of said first pushing bar, and said one end of said second pushing bar having an inclined surface inclined in the opposite direction to the inclined surface of said one end of said first pushing bar for pushing the other outwardly projecting end of said engaging element and for inserting it into said recessed portion, and a cutter bar positioned alongside one of said first and second pushing bars and arranged to cut a tape engaged within said recessed portion by said engaging and securing element.

2. An automatic tape engaging and securing device as claimed in claim 1, wherein said mechanism includes an upper press disc displaceably mounted for displacement into contact with the upper portion of said reel in the widthwise direction for positioning the tape, and a tape pushing bar and a stop with said tape pushing bar being displaceably mounted for movement toward said stop for securing the tape in the thickness direction therebetween.

3. An automatic tape engaging and securing device as claimed in claim 1, wherein said mechanism includes a rotatable frame, and an upper press disc elastically supported at the end portion of said rotatable frame and being movable with said frame for movement into pressing engagement with said reel.

4. An automatic tape engaging and securing device, as claimed in claim 1, including a pair of said reels mounted on said support, one said engaging and securing element for each said reel, and one said first pushing bar, second pushing bar and cutter bar associated with each said engaging and securing element.

* * * * *